US012175727B2

(12) United States Patent
Park et al.

(10) Patent No.: US 12,175,727 B2
(45) Date of Patent: Dec. 24, 2024

(54) AUTOMATIC IMAGE CLASSIFICATION AND PROCESSING METHOD BASED ON CONTINUOUS PROCESSING STRUCTURE OF MULTIPLE ARTIFICIAL INTELLIGENCE MODEL, AND COMPUTER PROGRAM STORED IN COMPUTER-READABLE RECORDING MEDIUM TO EXECUTE THE SAME

(71) Applicant: CROWDWORKS, INC., Seoul (KR)

(72) Inventors: Min Woo Park, Seongnam-si (KR); Sang Jae Yoo, Seoul (KR); Tae Sang Park, Seoul (KR)

(73) Assignee: CROWDWORKS, INC., Seoul (KR)

( * ) Notice: Subject to any disclaimer, the term of this patent is extended or adjusted under 35 U.S.C. 154(b) by 369 days.

(21) Appl. No.: 17/812,860

(22) Filed: Jul. 15, 2022

(65) Prior Publication Data

US 2023/0029045 A1 Jan. 26, 2023

(30) Foreign Application Priority Data

Jul. 26, 2021 (KR) .................. 10-2021-0097632

(51) Int. Cl.
*G06V 10/764* (2022.01)
*G06V 10/77* (2022.01)
*G06V 10/776* (2022.01)

(52) U.S. Cl.
CPC ........ *G06V 10/764* (2022.01); *G06V 10/7715* (2022.01); *G06V 10/776* (2022.01)

(58) Field of Classification Search
CPC ............ G06V 10/764; G06V 10/7715; G06V 10/776; G06V 10/80; G06V 10/774; G06V 20/70; G06F 18/285; G06N 3/045

(Continued)

(56) References Cited

U.S. PATENT DOCUMENTS 8,923,551 B1 * 12/2014 Grosz ................. H04L 67/12
715/202
9,858,496 B2 * 1/2018 Sun ...................... G06N 3/084
(Continued)

FOREIGN PATENT DOCUMENTS

KR 10-2014-0026977 A 3/2014
KR 10-2014-0136912 A 12/2014
(Continued)

OTHER PUBLICATIONS

Notice of Allowance An Office Action; mailed by the Korean Intellectual Property Office on Apr. 14, 2022, which corresponds to Korean Patent Application No. 10-2021-0097632.

*Primary Examiner* — Negussie Worku
(74) *Attorney, Agent, or Firm* — Studebaker & Brackett PC

(57) ABSTRACT

Disclosed is an automatic image classification and processing method based on the continuous processing structure of multiple artificial intelligence models. An automatic image classification and processing method based on a continuous processing structure of multiple artificial intelligence models includes receiving image data, generating a first feature extraction value by inputting the image data into a first feature extraction model among feature extraction models, generating a second feature extraction value by inputting the image data into a second feature extraction model among the feature extraction models, and determining a classification value of the image data by inputting the first and second feature extraction values into a classification model.

15 Claims, 13 Drawing Sheets

(58) Field of Classification Search
USPC .......................................................... 382/155
See application file for complete search history.

(56) References Cited

U.S. PATENT DOCUMENTS

| | | | |
|---|---|---|---|
| 11,989,931 B2* | 5/2024 | Jung | G06V 10/764 |
| 2006/0074653 A1* | 4/2006 | Mitari | G06V 40/165 |
| | | | 704/240 |
| 2012/0093396 A1* | 4/2012 | Dai | G06F 18/217 |
| | | | 382/159 |
| 2019/0205606 A1* | 7/2019 | Zhou | G06F 18/285 |
| 2020/0410335 A1* | 12/2020 | Gu | G06V 10/776 |
| 2022/0121884 A1* | 4/2022 | Zadeh | G06N 3/043 |
| 2023/0215125 A1* | 7/2023 | Luo | G06F 18/22 |
| | | | 382/159 |

FOREIGN PATENT DOCUMENTS

| | | |
|---|---|---|
| KR | 10-2015-0054258 A | 5/2015 |
| KR | 10-2016-0088224 A | 7/2016 |
| KR | 10-1734860 B1 | 5/2017 |
| KR | 10-2018-0080098 A | 7/2018 |
| KR | 10-2018-0126220 A | 11/2018 |
| KR | 10-2155839 B1 | 9/2020 |
| KR | 10-2021-0012659 A | 2/2021 |

* cited by examiner

AUTOMATIC IMAGE CLASSIFICATION AND PROCESSING METHOD BASED ON CONTINUOUS PROCESSING STRUCTURE OF MULTIPLE ARTIFICIAL INTELLIGENCE MODEL, AND COMPUTER PROGRAM STORED IN COMPUTER-READABLE RECORDING MEDIUM TO EXECUTE THE SAME

CROSS-REFERENCE TO RELATED APPLICATIONS

A claim for priority under 35 U.S.C. § 119 is made to Korean Patent Application No. 10-2021-0097632 filed on Jul. 26, 2021 in the Korean Intellectual Property Office, the entire contents of which are hereby incorporated by reference.

BACKGROUND

Embodiments of the inventive concept described herein relate to an image automatic classification and processing method based on a continuous processing structure of multiple artificial intelligence models, and more particularly, relate to an image automatic classification and processing method based on a continuous processing structure of multiple artificial intelligence models, capable of performing image classification and automatic pre-processing at the same time by converting an existing single artificial intelligence model into a feature extraction model and inputting an extracted feature classification value into a classification model based on the extracted feature classification value.

The development of artificial intelligence machine learning is expected to have a very large and widespread ripple effect in that it opens the possibility for the automation of intellectual activities. Machine learning technology, which has recently developed rapidly centering on deep learning, is decreasing the gap between a required level for practical use and actual artificial intelligence technology, heralding the emergence of various intelligent systems.

Deep learning is a technology that learns high-level information from data and is mainly based on deep neural networks. Core methodologies of deep learning include pre-training algorithms, convolutional networks (CNN), and recurrent neural networks (RNN).

Deep learning is applied to various fields such as computer vision, speech recognition, autonomous vehicles, robotics, and natural language processing, showing excellent performance that overwhelms existing methods, and standing out in computer vision and pattern recognition.

Meanwhile, research on a method of identifying an object using an image using machine learning is being actively conducted. As part of such machine learning, deep learning using a neural network having several hidden layers between an input layer and an output layer has high identification performance.

In order to proceed with training of such a deep learning network, training data in which a tag, that is, label or annotation data, is added to each data point by a labeler is required. Preparing such training data (i.e., classifying data correctly) may be labor intensive, expensive and cumbersome, especially when using large amounts of training data and when the quality of data preprocessing is not consistently high. Conventional interactive labeling is expensive and may not yield good results.

To solve this problem, more and more companies are collecting and processing large amounts of training data based on crowdsourcing that engages general public in some processes of corporate activities. That is, companies open one project and allow the general public, that is, operators, to participate in the project, thereby collecting necessary information through results of operations performed by the operators.

In this case, in order to collect more reliable information, the companies assign the results of the operations performed by the operators to an inspector to perform inspection.

Specifically, when one project is opened, a plurality of tasks are assigned to a plurality of operators, respectively. The operators perform a plurality of assigned tasks and provide task results, respectively. Thereafter, a plurality of inspection tasks are assigned to a plurality of inspectors respectively and the inspectors perform the assigned plurality of inspection tasks respectively.

Recently, in addition to crowdsourcing-based data labeling operations, a method is also emerging in which automatic labeling is performed to add tags, that is, labels to training images using a deep learning-based automatic labeling device, and the inspectors inspect the automatically-labeled training images to correct the tags or labels.

PRIOR ART LITERATURE (Patent Document 1) Republic of Korea Patent Registration No. 10-2155839

(Patent Document 2) Republic of Korea Patent Publication No. 10-2021-0012659

SUMMARY

In order to perform automatic labeling, various automatic labeling models are being developed according to labeling purposes and types. For example, an OCR (Optical Character Recognition) labeling model performs a function of recognizing a character element in a presented image and extracting a character in the form of a text object. In addition, various automatic labeling models that automatically generates training data suitable for training artificial intelligence models such as segmentation, polygon bounding box, object detection, and skeleton extraction have been being studied.

As shown in FIG. 1, a process of inputting images into a desired labeling model is required in order to use an original image as learnable labeled processing data using an automatic labeling model. Each labeling model is configured to perform different functions as needed, and each labeling model independently provides processing results.

However, such automatic labeling does not yet provide accurate results due to technical limitations, and in order to process original data such as images through the automatic labeling model, separate pre-processing for automatic labeling or an operation for determining whether original data is suitable for a corresponding model and classifying the original data in advance is required. When a desired image is incorrectly classified and input to an unsuitable labeling model, desired results cannot be obtained.

In addition, the automatically-labeled training data processed through the automatic labeling operation is inevitably subjected to verification and correction by an operator or inspector because the accuracy thereof is low.

From the point of view of operators and inspectors who have to process multiple labeling images, there is a need for an efficient utilization and an upgrade solution capable of shortening operating time by maximizing the automatic labeling technology.

Embodiments of the inventive concept provide an effective and new image labeling processing method in which a direct labeling method by an operator and an automatic labeling method are combined.

Further, embodiments of the inventive concept provide a method for automatically and quickly classifying a suitable image labeling method in consideration of image characteristics without a process of manually classifying a large number of images by an operator.

Further, embodiments of the inventive concept provide an image labeling type classification method capable of defining and providing an efficient feature extraction value that can be commonly applied to multiple classification models.

Further, embodiments of the inventive concept provide a new type of automatic labeling complex model capable of performing suitable image classification by configuring a plurality of models that perform only a simple automatic labeling function in a complex manner.

Further, embodiments of the inventive concept provide an efficient method for simultaneously processing a labeling type classification task of an image and an automatic labeling processing task through one solution.

Further, embodiments of the inventive concept provide an image classification method with improved classification stability and processing accuracy by utilizing a plurality of previously verified classification models.

Further, embodiments of the inventive concept provide a method to which a classification model application technology capable of further improving and accelerating classification and processing speed is applied.

Further, embodiments of the inventive concept provide a method capable of upgrading an existing model based on the classified and processed image labeling result value.

However, the objects of the inventive concept are not limited to the objects described above, and other objects may exist.

According to an embodiment, an automatic image classification and processing method based on a continuous processing structure of multiple artificial intelligence models includes receiving image data, generating a first feature extraction value by inputting the image data into a first feature extraction model among feature extraction models, generating a second feature extraction value by inputting the image data into a second feature extraction model among the feature extraction models, and determining a classification value of the image data by inputting the first and second feature extraction values into a classification model.

In some embodiments of the inventive concept, the first feature extraction model may recognize character objects on the image data.

In some embodiments of the inventive concept, the first feature extraction value may include the number of the character objects on the image data.

In some embodiments of the inventive concept, the first feature extraction value may include a ratio of an area of the character objects to a total area of the image data.

In some embodiments of the inventive concept, the character objects may include a plurality of different types, and the area ratio may be calculated as a ratio of sum of total areas of the plurality of the character objects.

In some embodiments of the inventive concept, the second feature extraction model may recognize identification objects on the image data.

In some embodiments of the inventive concept, the second feature extraction value may include the number of identification objects on the image data.

In some embodiments of the inventive concept, the second feature extraction value may include a ratio of an area of the identification objects to a total area of the image data or a shape of the identification objects.

In some embodiments of the inventive concept, the identification objects may include a plurality of different types, and the area ratio may be calculated as a ratio of sum of total areas of the plurality of the identification objects.

In some embodiments of the inventive concept, the classification model may consist of "n" classification models and the determining of the classification value may include determining the classification value from "n" classification candidate values output from a first classification model to an n-th classification model, respectively.

In some embodiments of the inventive concept, the determining of the classification value may include determining the classification candidate value, which is repeatedly output "m" or more times, as the classification value, among the "n" classification candidate values.

In some embodiments of the inventive concept, the determining of the classification value may include determining the classification value in advance before the classification candidate values are output from the n-p classification models when a classification candidate value which is output repeatedly "m" or more times is generated from "p" (p<n) classification models sequentially according to an order of outputting the classification candidate values among the "n" classification models.

In some embodiments of the inventive concept, the type of the classification candidate value may correspond to the number of the feature extraction models.

In some embodiments of the inventive concept, the "n" classification models may perform a classification task in parallel by receiving the first and second feature extraction values.

In some embodiments of the inventive concept, the classification model may include one of a decision tree classification model, a random forest classification model, and a logistic regression classification model.

In some embodiments of the inventive concept, the classification model includes one of XGBOOST, AdaBOOST, CatBOOST, and LightBGM classification models, In some embodiments of the inventive concept, the automatic image classification and processing method may further include providing a verification result by verifying the classification value of the image data, and modifying the first or second feature extraction model such that the first or second feature extraction value is changed based on the verification result.

In some embodiments of the inventive concept, the automatic image classification and processing method may further include re-determining the classification value of the image data by inputting the first and second feature extraction values generated by the modified first or second feature extraction models into the classification model.

Other specific details of the invention are included in the detailed description and drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
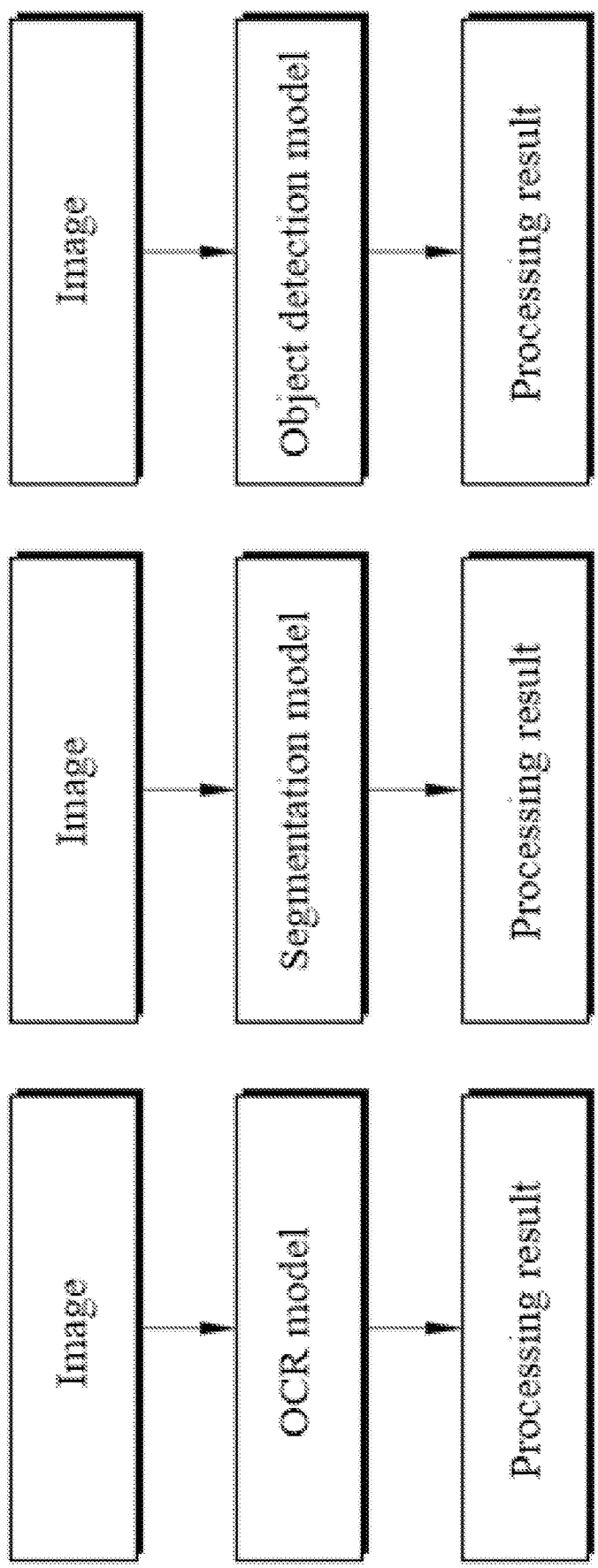
FIG. 1 is a diagram showing an execution structure of a conventional automatic labeling model.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements.

Although "first", "second", and the like are used to describe various components, these components are of course not limited by these terms. These terms are only used to distinguish one component from another. Thus, a first element discussed below could be termed a second element without departing from the teachings of the inventive concept.

Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein.

Hereinafter, embodiments of the present disclosure will be described with reference to the accompanying drawings.

Figure 2:
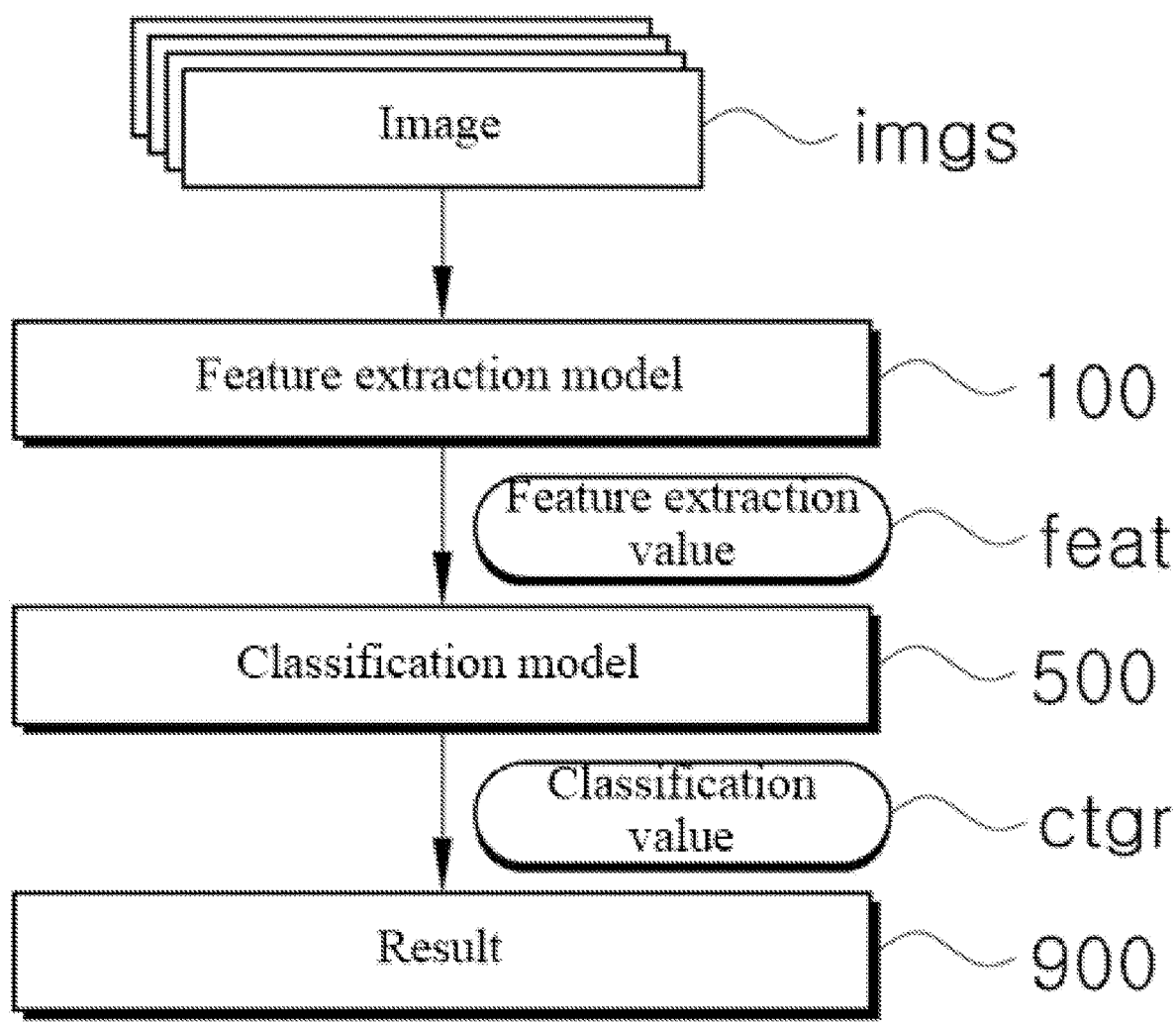
FIG. 2 is a diagram illustrating an automatic image classification and processing method based on a continuous processing structure of multiple AI models according to an embodiment of the inventive concept.
Figure 3:
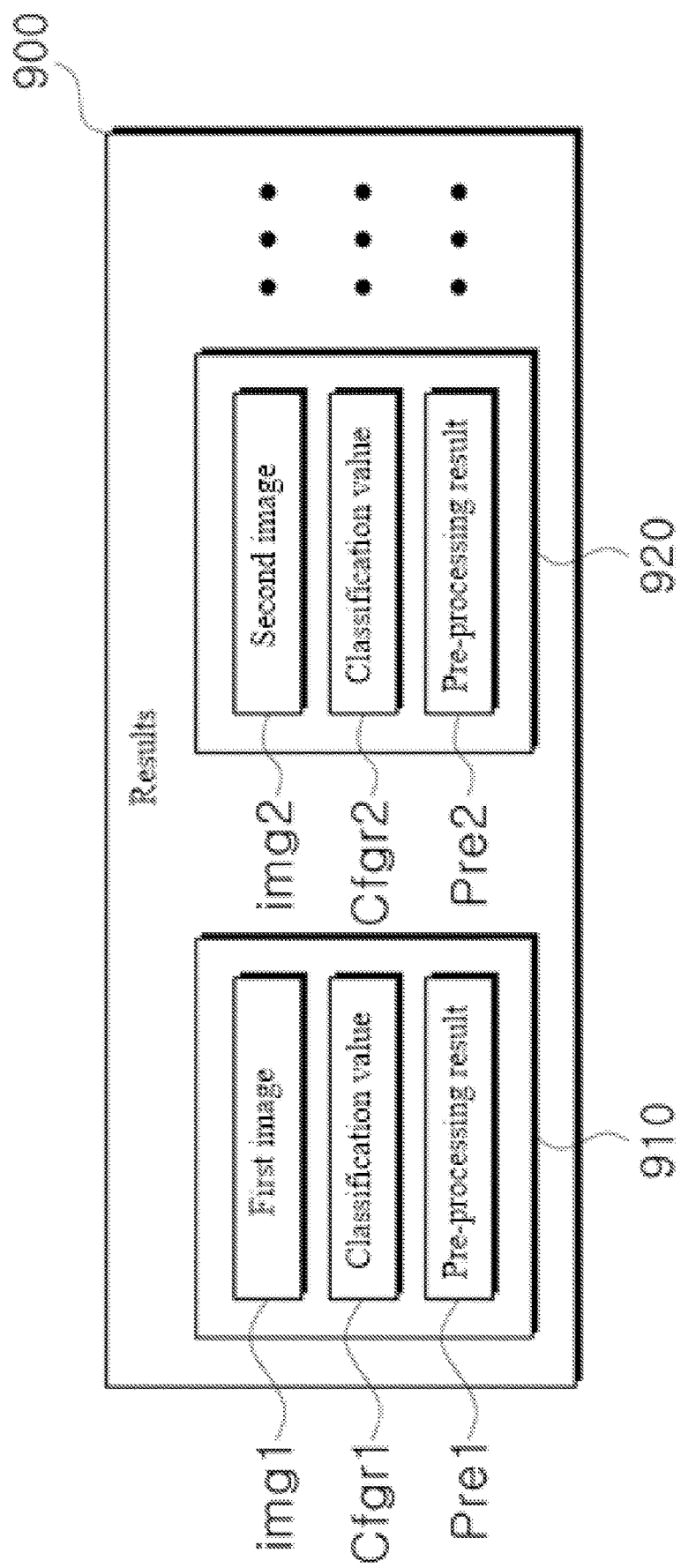
FIG. 3 is a diagram illustrating a configuration of a result according to the method of FIG. 2.

FIG. 2 is a diagram illustrating an automatic image classification and processing method based on a continuous processing structure of multiple AI models according to an embodiment of the inventive concept, FIG. 3 is a diagram illustrating a configuration of a result according to the method of FIG. 2, and FIGS. 4 to 6 are diagrams illustrating actual examples of results for each image type according to the method of FIG. 2.

Referring to FIG. 2, a system for executing an automatic image classification and processing method based on the continuous processing structure of multiple AI models according to an embodiment of the inventive concept may include a feature extraction model 100 and a classification model 500.

The feature extraction model 100 may utilize a labeling model used to generate existing artificial intelligence training data, and may be a new model separately created to properly generate feature extraction values (feat), which are input values for input to the classification model 500. The feature extraction model 100 may receive original images (imgs) in the form of an input image dataset and determine feature extraction values (feat) required for the classification model 500. A different feature extraction value (feat) may be derived for each input original image (imgs). The feature extraction model 100 may calculate a feature extraction value (feat) for determining which automatic labeling model an original image (imgs) is suitable for.

The feature extraction value (feat) may include a feature value of each labeling model. For example, the feature extraction value (feat) may include an indication of whether recognized characters exist to determine whether it is suitable for labeling model for OCR (Optical Character Recognition), the number of recognized characters or recognition units of recognized characters, and the size or ratio of an area including recognized characters to an entire image area. In addition, the feature extraction value (feat) may include information on various character recognition, such as a relative size ratio to a non-character object, information on an alignment direction of a recognized character with an image, a language type of a recognized character, and a language mixture ratio of recognized characters.

The feature extraction model 100 may include an artificial intelligence model or algorithm for determining a feature extraction value (feat) from the original image (imgs). In order to calculate a feature extraction value (feat) according to optical character recognition, an optical character recognition labeling model or an artificial intelligence model having a similar structure may be included.

The feature extraction model 100 may support various image types in addition to optical character recognition to process all types of data that can be classified in the classification model 500. In order to support various artificial intelligence learning data image types, the feature extraction model 100 may include an artificial intelligence model or algorithm for extracting a feature extraction value (feat) corresponding to each image type.

The feature extraction model 100 may support artificial intelligence learning data processing types according to various purposes, for example, classification, object detection, segmentation, polygon, key point, and the like, in addition to optical character recognition.

For example, the feature extraction value (feat) may include data on the number of recognized objects, type and type distribution of recognized objects, types, individual size of recognized objects, a vector value including the alignment direction of the recognized object, arrangement of recognized objects, a relative depth of the recognized object, the size or area that the entire recognized object occupies on the entire image in order to determine whether a corresponding original image (imgs) is an image suitable for the object detection labeling model. The type of a recognized object may be included in a predetermined range, and a server (not shown) in which reference data referred to by the feature extraction model 100 for information on the recognized object is constructed may be configured separately.

In addition, for example, the feature extraction value (feat) may include data on the number of segmentation areas and the types and type distribution of segmentation areas, the types of segmentation areas, the individual size of the segmentation area, arrangement of the areas, the size or a ratio occupied by all of the segmented areas on the entire image to determine whether the corresponding original image (imgs) is an image suitable for the segmentation labeling model. The type of the segmentation area may be included in a predetermined range.

The feature extraction value (feat) determined by the feature extraction model 100 may be input to the classification model 500, and the classification model may calculate a classification value (ctgr) by determining whether it is suitable for an original image (imgs) to be preprocessed according to a certain automatic labeling model based on the feature extraction value (feat).

The classification model 500 may be an artificial intelligence model in which a target image requested by the user for pre-processing and a final result type obtained by pre-processing the target image are configured as a training data set and training is performed based on results collected through the previously-performed project. By building the classification model 500 using images and type values of images accumulated through various data labeling projects in the past, it is possible to determine an appropriate classification value (ctgr) according to the feature extraction value (feat).

For example, since an image in which recognized characters are continuous and have similar vector direction values, among specific images is classified as an image suitable for the optical character recognition model according to the pattern of the previously-performed project, and is subjected to labeling for optical character recognition, the classification model 500 is trained with the above-described case to obtain a result value 900 indicating that the classification value (ctgr) determined by the classification model 500 is an image suitable for optical character recognition when the number of recognized characters included in the feature extraction value (feat) of a target image (imgs), the direction value of the recognized characters or the like are included in a predetermined range.

In addition, since an image in which there are a plurality of recognized objects and the recognized objects are arranged with a focus according to a photographing direction around a specific road object, among specific images is classified as an image suitable for the segmentation model according to the pattern of the previously-performed project and then is subjected to labeling for segmentation, the classification model 500 is trained with the above-described case to obtain the result value 900 indicating that the classification value (ctgr) determined by the classification model 500 is an image suitable for segmentation when the above-described information is included in the feature extraction value (feat) of a target image (imgs).

The classification value (ctgr) may be determined within the range of the predetermined pre-processing types of images, and may be determined within the range of AI learning data processing types according to various purposes, such as predetermined optical character recognition (ocr), classification, object detection segmentation, polygon, and key point.

The result value 900 may mean an automatic labeling type finally determined based on the classification value (ctgr), and when the result value 900 is determined to be segmentation, the result value 900 may indicate that the corresponding image (imgs) is an image suitable for segmentation. The type of artificial intelligence learning data may be finally determined based on the result value 900, and necessary subsequent processes may be performed according to the result value 900.

Referring to FIG. 3, the result value 900 may include a classification value (ctgr) and a preprocessing result (pre) of each of initially-input images (imgs). For example, the first image img1 is classified according to the first classification value (ctgr1), and a first result value 910 including the first preprocessing result (pre1) automatically labeled according to the classified type can be derived. When there are a plurality of initially-input images (imgs), a plurality of result values may also be provided. An image in which a feature is not extracted by the feature extraction model 100 or a classification value is not properly derived by the classification model 500 may be provided as unclassified data on the result value 900.

As described above, in order to properly perform the necessary labeling processing to use original image data as artificial intelligence training data, it is necessary to first classify which labeling type the original image data is suitable for, and perform an appropriate labeling operation corresponding to the classification result. According to an embodiment of the inventive concept, it is possible to not only automate the labeling type classification of a specific image previously performed manually by humans, but also simultaneously perform the actual automatic labeling process according to the labeling type classification to provide complete labeling data.

The provided pre-processing result (pre) may be a completed final version, but additional work may be performed to improve the completeness by reviewing the pre-processing result by the inspector.

Figure 4:
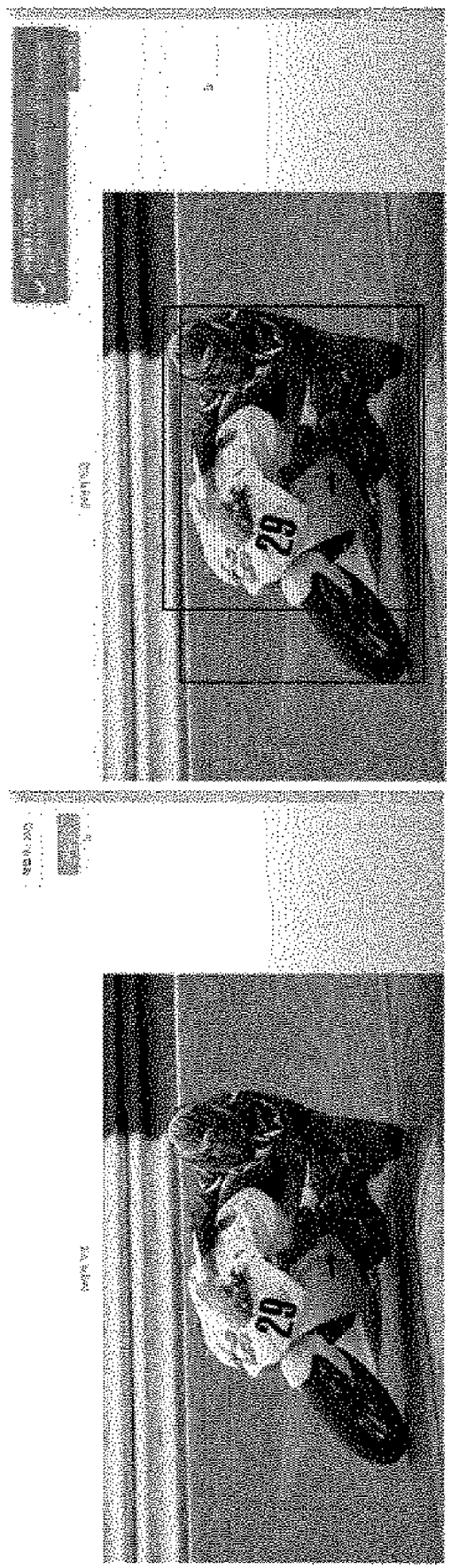
FIGS. 4 to 6 are diagrams illustrating actual examples of results for each image type according to the method of FIG. 2.
Figure 5:
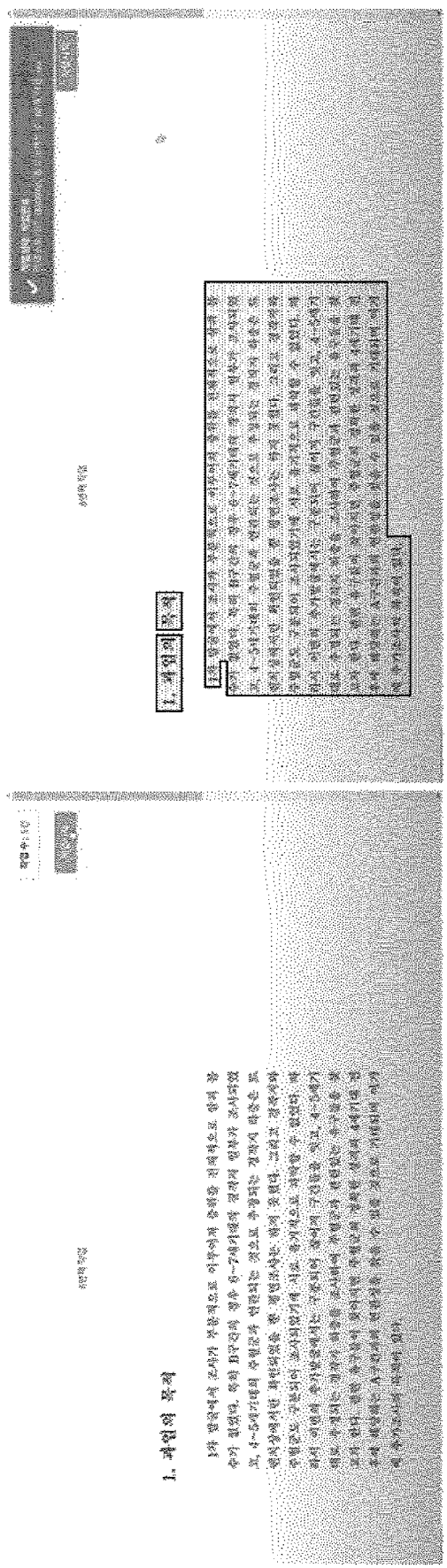
Figure 6:
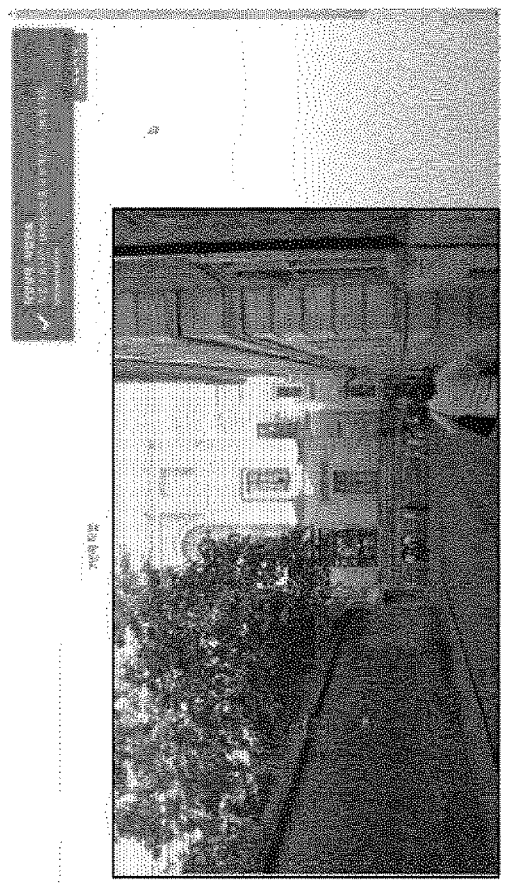
Figure 6:

Referring to FIGS. 4 to 6, the final result value 900 for each classification type for an exemplary original image (imgs) is shown.

FIG. 4 shows labeling data in which an original image (imgs) is classified into an object detection type and preprocessing for object detection is performed. The data labeled as object detection type may be used to train an artificial intelligence model that are built for various purposes, but is not limited thereto. This is an example of the result value 900 in which labeling data is automatically generated in the form of a bounding box as a result of recognizing a motorcycle object and a human object on the entire image.

FIG. 5 shows labeling data in which an original image (imgs) is classified as an optical character recognition type and pre-processing for optical character recognition is performed, and is an example of the result value 900 in which labeling data is generated in the form of converting an image into text by recognizing a character object on the entire image.

FIG. 6 shows labeling data in which an original image (imgs) is classified into a segmentation type and pre-processing for segmentation is performed. The segmentation-type labeling data may be used to train an artificial intelligence model built in fields such as autonomous driving, control, control service, and security detection, but is not limited thereto. The result value 900 as a result of grouping objects having the same property on the entire image, recognizing them as a segmentation area and generating data labeled as a plurality of segmentation areas based on the segmentation are exemplarily shown.

Figure 7:
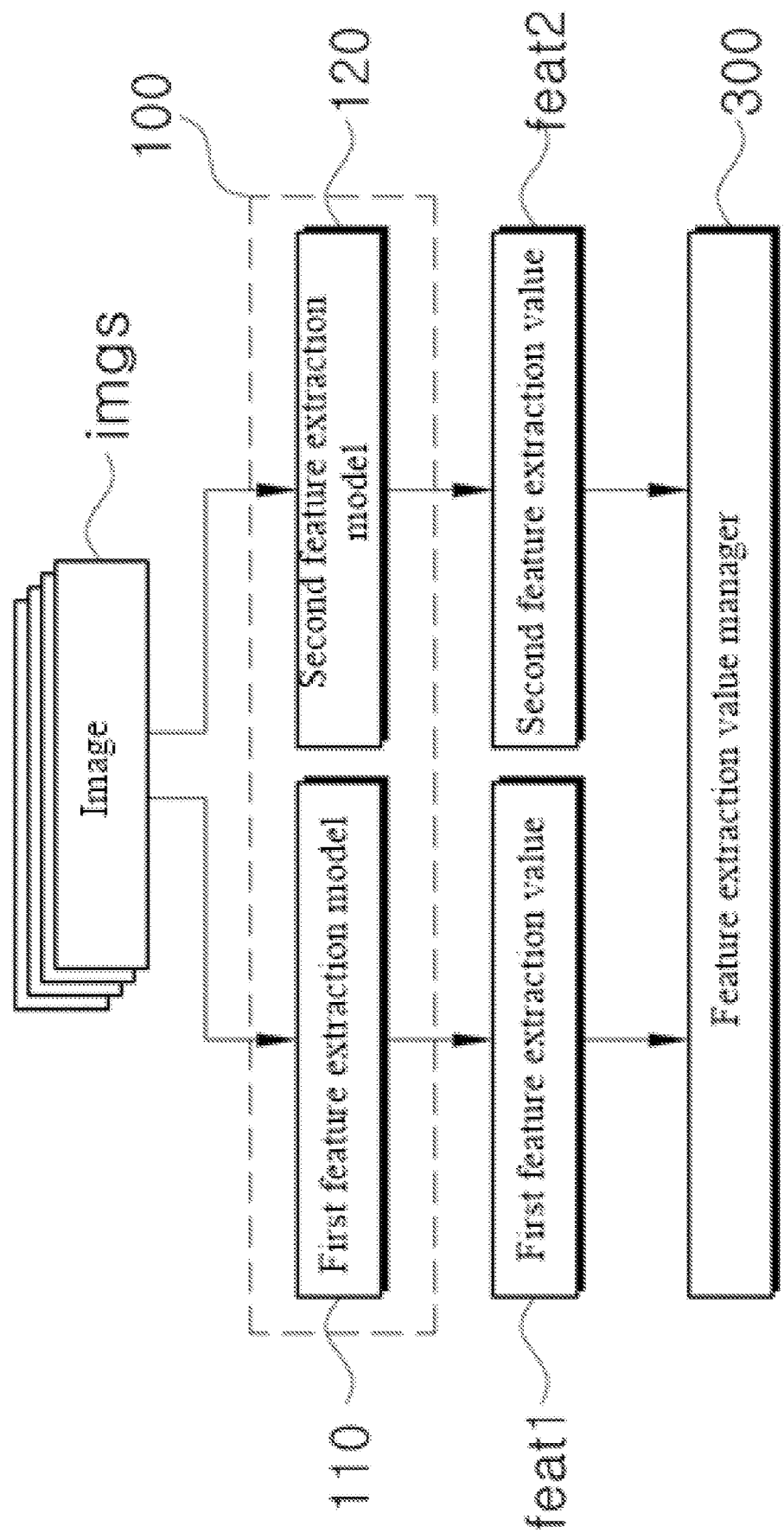
FIGS. 7 and 8 are diagrams illustrating an automatic image classification and processing method based on a continuous processing structure of multiple AI models according to another embodiment of the inventive concept, which consists of a plurality of feature extraction models and a plurality of feature extraction values.
Figure 8:
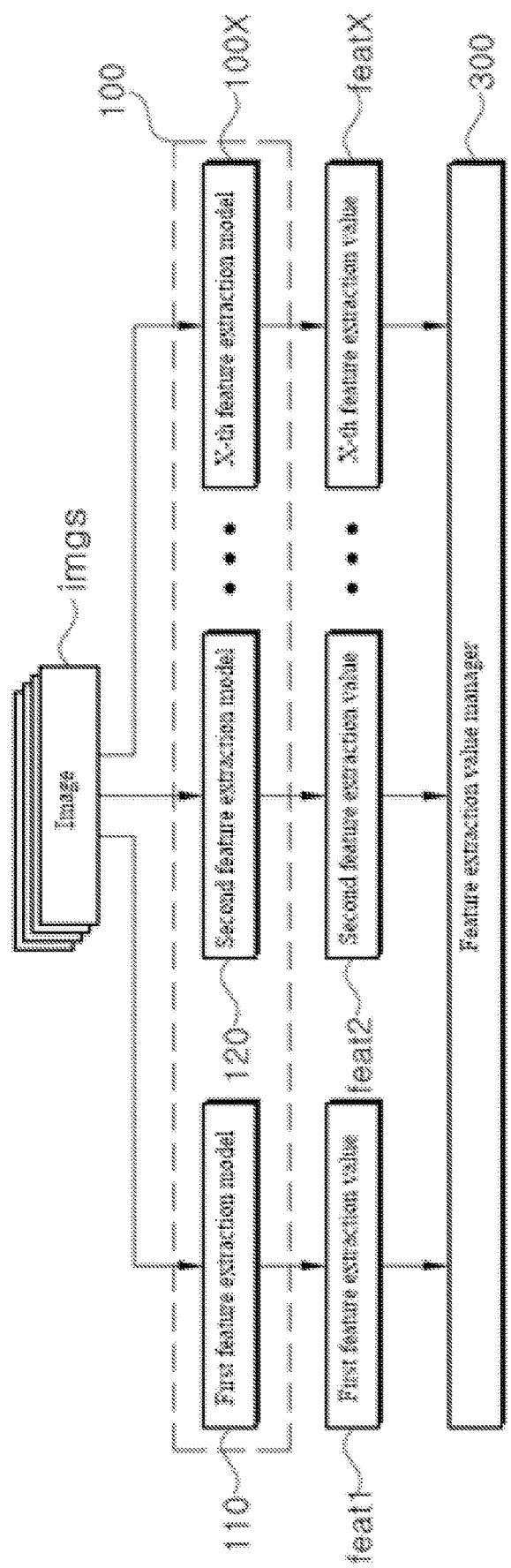
Figure 9:
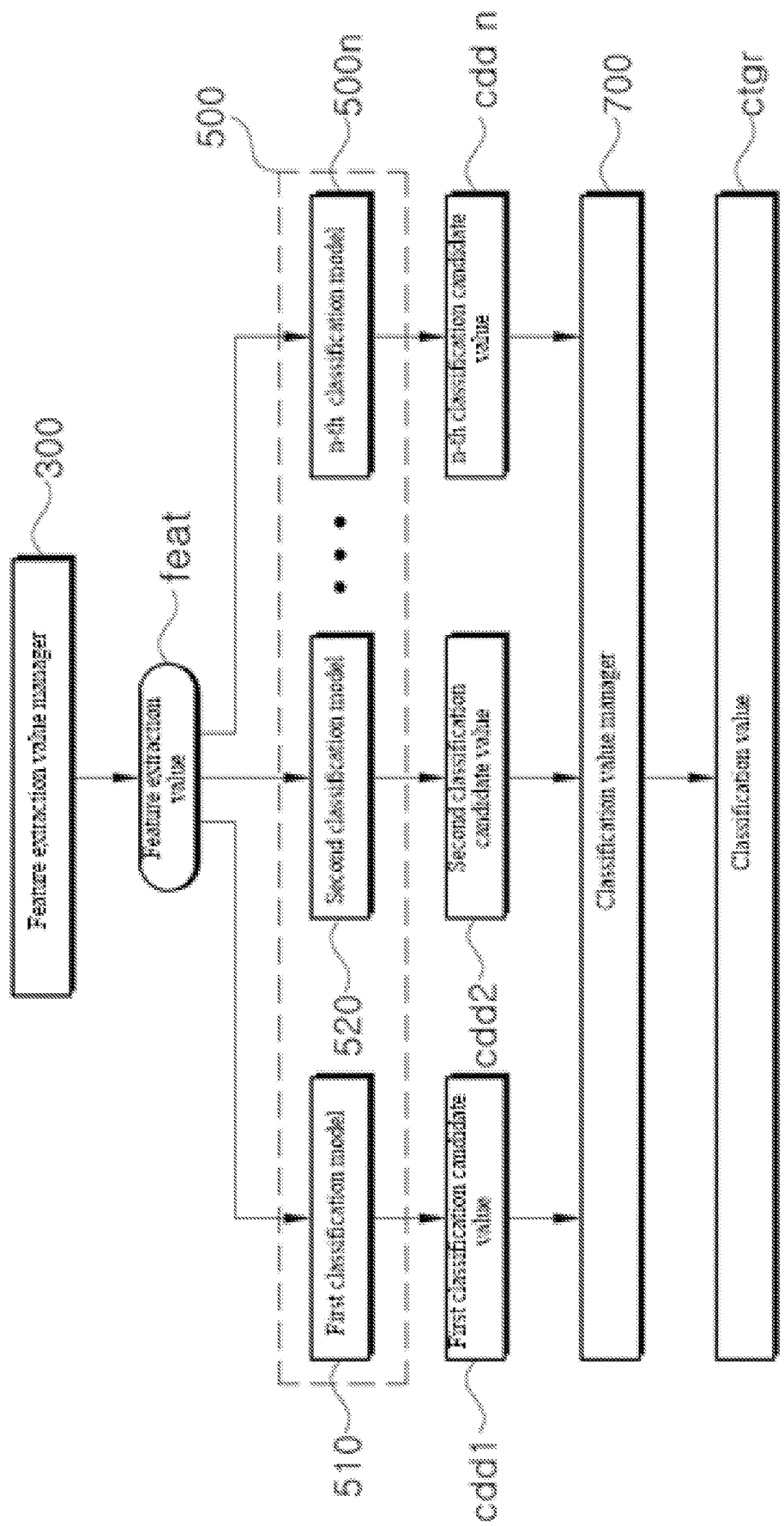
FIG. 9 is a diagram illustrating an automatic image classification and processing method based on a continuous processing structure of multiple AI models according to another embodiment of the inventive concept composed of a plurality of classification models.

Hereinafter, an image automatic classification and processing method based on a continuous processing structure of multiple AI models according to other embodiments of the inventive concept will be described with reference to FIGS. 7 to 9. FIGS. 7 and 8 are diagrams illustrating an automatic image classification and processing method based on a continuous processing structure of multiple AI models according to another embodiment of the inventive concept, which consists of a plurality of feature extraction models and a plurality of feature extraction values, and FIG. 9 is a diagram illustrating an automatic image classification and processing method based on a continuous processing structure of multiple AI models according to another embodiment of the inventive concept composed of a plurality of classification models.

Referring to FIGS. 7 and 8, an automatic image classification and processing method based on the continuous processing structure of multiple AI models according to an embodiment of the inventive concept may include receiving image data (imgs), generating a first feature extraction value (feat1) by inputting the image data (imgs) into a first feature extraction model 110 of feature extraction models 100, generating a second feature extraction value (feat2) by inputting the image data (imgs) into a second feature extraction model 120 of the feature extraction models 100, and determining a classification value (ctgr) of the image data (imgs) by inputting the first and second feature extraction values (feat1 and feat2) into the classification model 500.

The feature extraction model 100 for inputting the original image (imgs) that has not been subjected to labeling may be configured in plurality. Finally, according to the number of artificial intelligence learning data types to be classified according to the classification model 500, the feature extraction model 100 may be composed of two or more plurality of feature extraction models 100X.

The feature extraction models 100X may receive the same original image (imgs), and output feature extraction values (featX) as many as the number of feature extraction models for one image. The output feature extraction value (feat) may be collected by a feature extraction value manager 300 to configure a multi-faceted feature value for an individual original image (imgs).

The feature extraction value manager 300 may determine a dataset of a plurality of collected feature extraction values (featX) as one feature extraction value and connect and manage the original image (imgs) and the corresponding feature extraction value (feat). For example, when the second feature extraction value (feat2) derived by the second specific extraction model is not received, the feature extraction value manager 300 may wait without generating the final feature extraction value (feat), and re-receive the feature extraction value by sending a re-request to the feature extraction model 100 in which the problem has occurred. In addition, a function of increasing the weight of the feature extraction value derived from a specific feature extraction model by assigning weights to a plurality of feature extraction values may be performed.

When the feature extraction model 100 is configured in plurality, the original image (imgs) may be simultaneously input to the plurality of feature extraction models 100, and the X feature extraction models 100X may calculate the feature extraction values (featX) in parallel, and the feature extraction value manager 300 may generate a final feature extraction value (feat) by collecting the received feature extraction value (featX).

The feature extraction value manager 300 may reflect a time taken to receive the feature extraction value (feat) from the feature extraction model 100 in the feature extraction value (feat), and also in weight adjustment by reflecting the required time in each feature extraction value.

In some other embodiments, when a predetermined time elapses after the feature extraction model 100 is configured in plurality and the original image (imgs) is input to the plurality of feature extraction models 100X, the final feature extraction value may be determined although feature extraction values (feat) have not been collected.

The more the elements constituting the feature extraction value (feat), for example, the number or size of identification objects, the higher the accuracy of the final classification value (ctgr) and the result value 900, but when multiple variables of the feature extraction value (feat) are set in a state where the number of artificial intelligence training data for training the feature extraction model 100 is small, the accuracy of the classification value (ctgr) may be rather reduced.

For example, the first feature extraction model 110 may recognize a character object on the image data (imgs). The first feature extraction value (feat1) may include the number of character objects on image data (imgs) or the ratio of the area of the character objects to the total area of the image data (imgs). The character object may include a plurality of different types, and the area ratio may be calculated as a ratio of the sum of the total areas of the plurality of character objects.

To this end, the first feature extraction model 110 may be configured as an algorithm-based optical character recognition model, and may have a structure in which several modules such as a module for finding text lines and a module for dividing text into words are used in combination.

In other cases, the first feature extraction model 110 may be an artificial intelligence-based optical character recognition model to which deep learning is applied, and the first feature extraction model 110 may be composed of two stages: a model that detects a character area (Text Detection Model) and a model that recognizes characters in that area (Text Recognition Model) to enable smooth training by using various data, and improve resource efficiency and accuracy for each language, but is not limited thereto.

In order to improve the phenomenon that the text recognition rate is lowered due to damage or distortion of shading in the process of recognizing an analog document in a processor unit, it is possible to improve the recognition rate of image elements by redistributing the contrast of the image through histogram normalization, for example.

When an image (imgs) of which the recognition rate is improved is input to the first feature extraction model 110 based on CNN (Convolutional Neural Network), the area and angle of the recognized character are extracted by the first feature extraction model 110. Then, the angle of the recognized character is adjusted such that the angle of the area of the recognized character is horizontal with an image reference axis, and the image may be divided into text units. When the recognized characters are divided, a process of recognizing which character a corresponding image partial area corresponds to may be performed, and through this, the final first feature extraction value (feat1) may be determined. To this end, the artificial intelligence model constituting the first feature extraction model may have been trained with more than a predetermined amount of training data through a dataset of an image for optical character recognition and recognized characters.

For example, the second feature extraction model 120 may recognize an identification object on the image data (imgs). The second feature extraction value (feat2) may include the number of identification objects on the image data (imgs) or the ratio of the area of the identification objects to the total area of the image data (imgs). The identification objects may include a plurality of different types, and the area ratio may be calculated as a ratio of sum of total areas of the plurality of the identification objects.

To this end, the second feature extraction model 120 is composed of an artificial intelligence-based object detection model to identify an object on an image and calculate a result value for object recognition, object classification, object location, or the like.

As the second feature extraction model 120, an artificial intelligence model employing a two-stage detection method that performs region proposal on original images (imgs) and then performs classification and regression operations, for example, R-CNN, SPPNet, fast R-CNN, faster R-CNN, or the like may be used, but is not limited thereto. As one of the Region Proposal algorithms, a Selective Search method that finds similar regions based on color, texture, size, and shape and performs regions as a layer to group regions may be used, but is not limited thereto.

In some other embodiments, as the second feature extraction model 120, an AI model employing an one-stage detection method that simultaneously performs region proposal, classification, and regression operations, for example, YOLO, or the like may be used, but is not limited thereto.

Referring to FIG. 9, the classification model 500 is composed of "n" classification models, and the determining of the classification value (ctgr) may include determining a classification value (ctgr) from classification candidate values (cdd) output from the first classification model 510 to the n-th classification model 500n, respectively. Among the "n" classification candidate values (cdd), a classification candidate value (cdd) which is repeatedly output "n" or more times may be determined as the classification value (ctgr), but the inventive concept is not limited thereto.

In order to perform data labeling type classification of original images (imgs) using feature extraction values (feat) collected through the feature extraction value manager 300, a plurality of classification models are configured, and the plurality of classification models 500n output one classification candidate value (cddn), individually. The classification model 500 may be configured in plurality to ensure the accuracy and reliability of classification, and may receive a feature extraction value (feat) for each image determined through the feature extraction value manager 300 and classification operation may perform in each classification model 500n. The collected plurality of classification candidate values (cddn) may be collected by a classification value manager 700, and the final classification value (ctgr) of the artificial intelligence learning data type for an image (imgs) may be determined according to a predetermined decision method by the classification value manager 700.

For example, when the artificial intelligence training data types set to be identified in the classification model 500 are a total of three types of optical character recognition (OCR), object detection, and segmentation, each classification model 500n may receive the same feature extraction value (feat), and output each classification candidate value (cddn) based on each algorithm or artificial intelligence model. The classification value manager 700 may determine a final classification value (ctgr) based on three classification candidate values (cddn). The classification value (ctgr) may be determined according to a voting method for a plurality of classification candidate values, but is not limited thereto. The classification value (ctgr) may be determined in such a way that a separate weight is given according to the type of the classification model 500.

The feature extraction value (feat) may be simultaneously input to a plurality of classification models 500n, and the plurality of classification models 500n may perform classification operations in parallel according to the same feature extraction value (feat), and the classification value manager 700 may generate a final classification value (ctgr) by collecting the received "n" classification candidate values (cddn).

The classification value manager 700 may reflect the time taken to receive the classification candidate value (cddn) from the classification model 500 in the classification value (ctgr), and reflect the required time in each classification candidate value for use in weight adjustment.

In some other embodiments, a classification candidate value (cdd) which is repeatedly output "m" or more times may be determined as the classification value (ctgr) among the "n" classification candidate values (cdd) and the determining of the classification value (ctgr) may include determining a classification value (ctgr) in advance before the classification candidate value (cdd) is output by the classification models 500, of which the number is obtained by subtracting "p" from "n", when the classification candidate value (cdd) which is repeatedly output "m" or more times are output from p (p<n) classification models 500 according to the order of outputting the classification candidate value (cddn) in the "n" classification models 500n.

In some other embodiments, in a case where a predetermined time has elapsed after the feature extraction value (feat) is input to the plurality of classification models 500n, even when a predetermined threshold is achieved although all of the classification candidate values (cddn) are not collected, a final classification value (ctgr) may also be determined.

The types of classification candidate values (cdd) may correspond to the number of feature extraction models 100, and "n" classification models 500n may receive the first and second feature extraction values (feat1 and feat2) and perform classification operations in parallel at the same time.

The plurality of classification models 500n may include one of a decision tree classification model, a random forest classification model, and a logistic regression classification model.

In addition, the plurality of classification models 500n may include a classification model selected from among the XGBOOST classification model, the AdaBOOST classification model, the CatBOOST classification model, and the LightBGM classification model according to the type of the original image (imgs).

Figure 10:
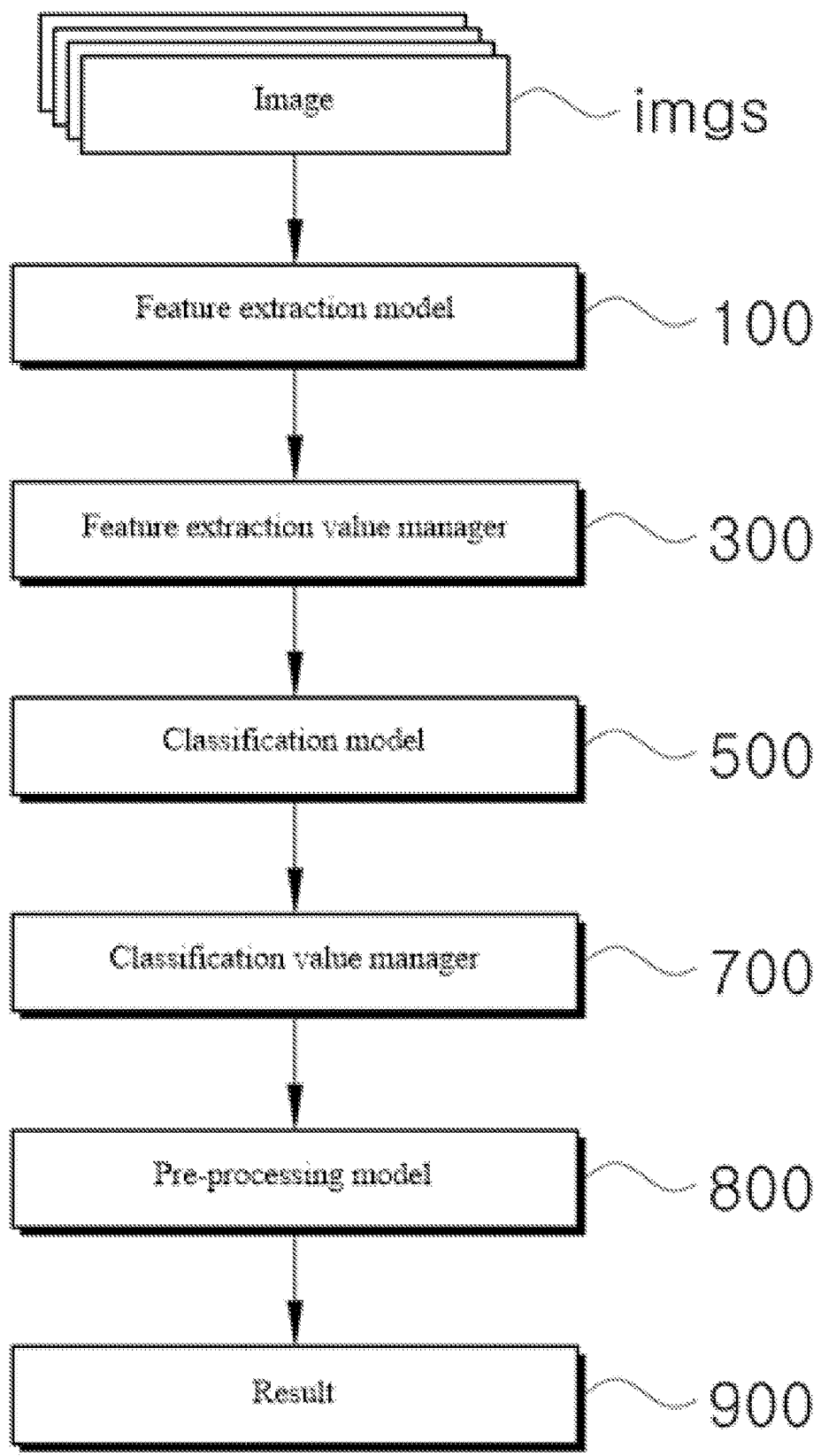
FIG. 10 is a diagram illustrating an image automatic classification and processing method based on a continuous processing structure of multiple AI models according to another embodiment of the inventive concept in which a feature extraction model and a pre-processing model for automatic labeling are separately configured.
Figure 11:
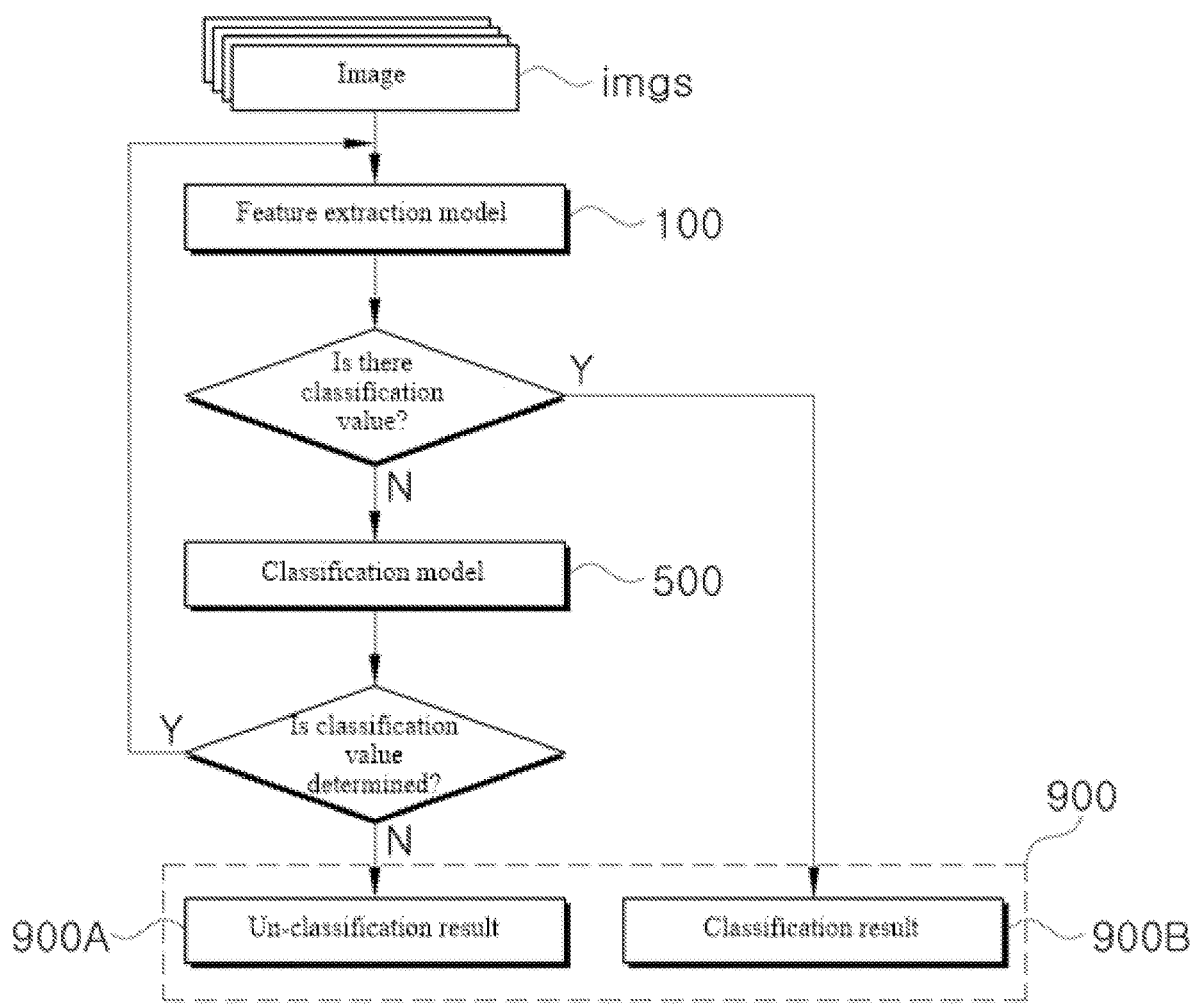
FIG. 11 is a diagram illustrating an image automatic classification and processing method based on a continuous processing structure of multiple AI models according to another embodiment of the inventive concept in which the feature extraction model performs even an automatic labeling function.

FIG. 10 is a diagram illustrating an image automatic classification and processing method based on a continuous processing structure of multiple AI models according to another embodiment of the inventive concept in which a feature extraction model and a pre-processing model for automatic labeling are separately configured, and FIG. 11 is a diagram illustrating an image automatic classification and processing method based on a continuous processing structure of multiple AI models according to another embodiment of the inventive concept in which the feature extraction model performs even an automatic labeling function.

Referring to FIG. 10, an automatic image classification and processing method based on the continuous processing structure of multiple AI models according to another embodiment of the inventive concept may include inputting an original image (imgs) into the feature extraction model 100 to determine a feature extraction value (feat), determining a final classification value (ctgr) by inputting the feature extraction value (feat) into the classification model 500, and generating a labeled result data 900 by inputting the original image (imgs) into an appropriate pre-processing model 800 according to the classification of the type of the artificial intelligence learning data to perform the automatic labeling.

The pre-processing model 800 may be an artificial intelligence model trained with training data in advance to automatically label images, and the pre-processing model 800 may include a neural network structure constructed in a different form from the feature extraction model 100.

When the original image (imgs) is input to the pre-processing model 800 corresponding to the final classification value (ctgr) determined by the classification value manager 700, a previously-extracted feature extraction value (feat) may be provided to the pre-processing model 800 together. The feature extraction value (feat) provided together may enable replacement or omission of some of operations to be performed in the preprocessing model 800, thereby accelerating a processing speed.

In some other embodiments, after the classification value (ctgr) is determined, the feature extraction model 100 may generate a preprocessing result (pre) based on feature data (not shown) generated to determine the feature extraction value (feat) without performing additional operations through the preprocessing model 800. The preprocessing result (pre) may include annotation data corresponding to the classification value (ctgr). For example, when the classification value (ctgr) is object detection, annotation data including the type, location, size, and coordinates of an identified object or the like may be generated. For this purpose, the feature data generated in the feature extraction model 100 may be stored by the feature extraction value manager 300, and the classification value manager 700 may determine the classification value (ctgr), and then receive feature data by requesting the feature data from the feature extraction value manager 300. Alternatively, a separate server (not shown) or a separate storage space (not shown) for storing the feature data generated in the process for determining the feature extraction value (feat) in the feature extraction model 100 may be provided.

In some other embodiments, the preprocessing result (pre) may be performed in advance in each model 100X when the feature extraction model 100 determines the feature extraction value (feat). In this case, the feature data may be the pre-processing result (pre) itself in the form of annotation data. In this case, when the feature extraction value (feat) for each image (imgs) and the preprocessing result (pre) in the form of annotation data are simultaneously generated through the feature extraction model 100, and the classification value (ctgr) is determined by inputting the feature extraction value (feat) into the classification model 500, the pre-processing result (pre) in the form of annotation data generated in advance in the feature extraction model 100 corresponding to the classification value (ctgr) may be determined as the final annotation data result of the corresponding image.

For example, when the feature extraction model 100 is composed of the first feature extraction model 110 for optical character recognition and the second feature extraction model 120 for segmentation, the first feature extraction model 110 may simultaneously generate the first feature extraction value (feat1) and the first annotation data (not shown) with respect to the first original image (img1), and the second feature extraction model may simultaneously generate the second feature extraction value (feat2) and the second annotation data (not shown) with respect to the same first original image (img1). The final feature extraction value (feat) may be determined by combining the first feature extraction value (feat1) and the second feature extraction value (feat2), and then input to the classification model 500. When the final classification value (ctgr) is determined, for example, as optical character recognition based on the feature extraction value (feat) in the classification model 500, the first annotation data processed in advance by the first feature extraction model 110 may be determined as a pre-processing result (pre) on the final result 900.

Referring to FIG. 11, when a classification value (ctgr) is derived, automatic labeling for the original image (imgs) may be performed continuously in the feature extraction model 100X suitable for the classification value (ctgr) among a plurality of feature extraction models 100 according to the classification value. That is, the single feature extraction model 100 may be used for the purpose of determining the feature extraction value (feat), and may also be used for the purpose of generating the preprocessing result (pre) after the classification value (ctgr) has been determined.

In some other embodiments, the feature extraction model 100 in a first mode which determines the feature extraction value (feat), and the feature extraction model 100 in a second mode which generates the preprocessing result (pre) after the classification value (ctgr) has been determined may operate in different structures. To this end, an input parameter used when the feature extraction model 100 is in the first mode and an input parameter used when the feature extraction model 100 is in the second mode may be set differently.

Since only the determined feature extraction value (feat) exists and the classification value (ctgr) is not yet determined when the original image (imgs) is input to the feature extraction model 100 in the first mode, a process for determining the feature extraction value (feat) is performed, the feature extraction value (feat) may be input to the classification model 500 by deviating from the flowchart of FIG. 11. When the classification value (ctgr) is not determined based on the feature extraction value (feat) input through the classification model 500, it is accumulated as an unclassified result (900A), and when the classification value (ctgr) is determined, the original image (imgs) is input again into the feature extraction model 100 in the second mode corresponding to the classification value (ctgr) to generate a preprocessing result 900 including annotation data.

To this end, the feature extraction model 100 may have a structure corresponding to the classification value (ctgr) on a one-to-one basis. For example, when the classification value (ctgr) is set to optical character recognition, segmentation, and object detection, the feature extraction model 100 may include the first feature extraction model 110 for determining a feature extraction value and processing an optical character recognition under assumption that the original image (imgs) is used for the purpose of optical character recognition, the second feature extraction model 120 for determining the feature extraction value for object detection and processing object detection under assumption that the original image (imgs) is used for the purpose of object detection, and a third feature extraction model 130 for determining a feature extraction value for segmentation and processing segmentation under assumption that the original image (imgs) is used for the purpose of segmentation.

Figure 12:
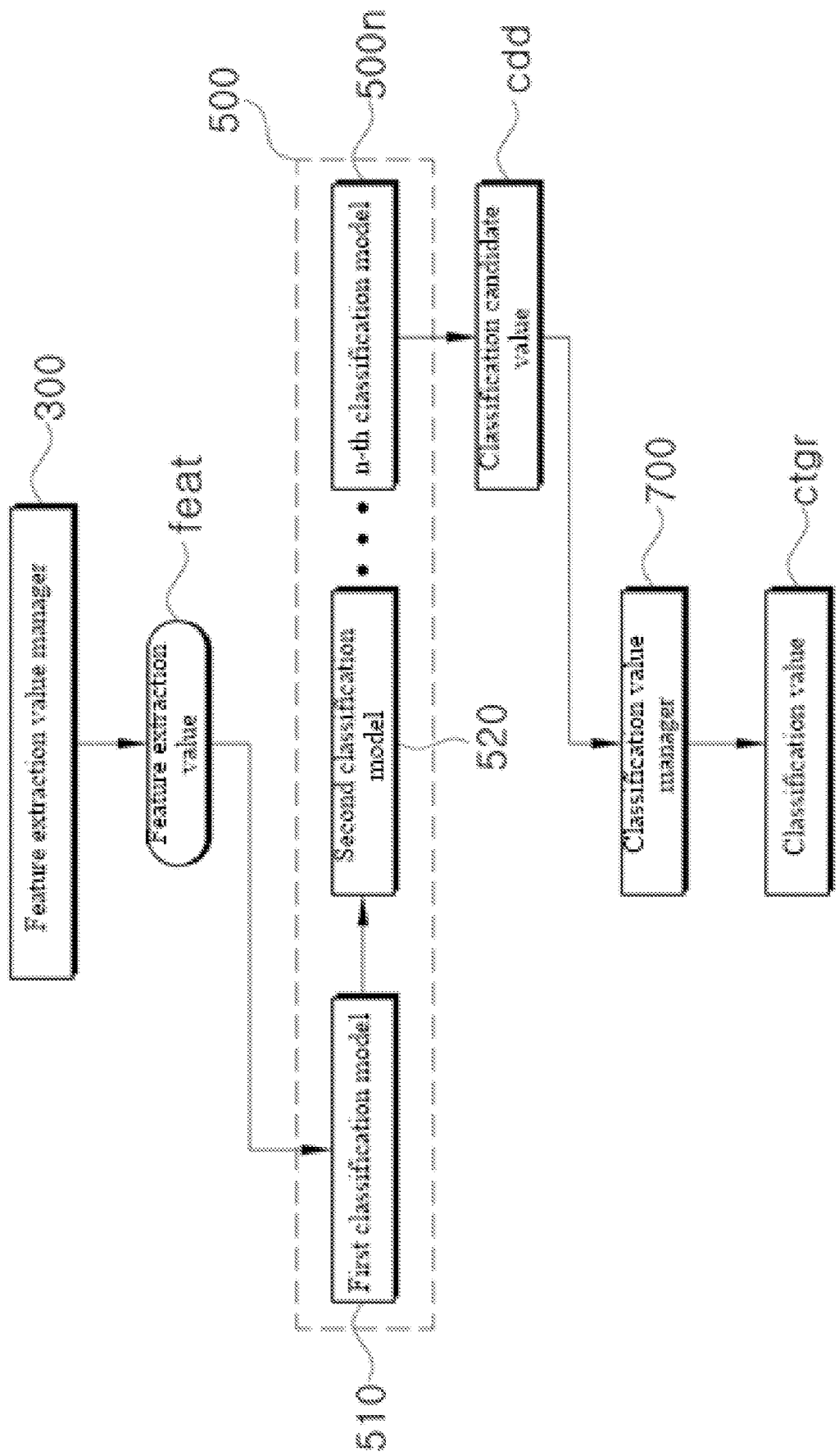
FIG. 12 is a diagram illustrating an image automatic classification and processing method based on a continuous processing structure of multiple AI models according to another embodiment of the inventive concept in which a plurality of classification models are connected in serial.

FIG. 12 is a diagram illustrating an image automatic classification and processing method based on a continuous processing structure of multiple AI models according to another embodiment of the inventive concept in which a plurality of classification models are connected in serial.

Referring to FIG. 12, "n" classification models 500n arranged in a predetermined order may sequentially receive a feature extraction value (feat), rather than the "n" classification models 500n simultaneously receive a feature extraction value (feat) and simultaneously generate classification candidate values (cdd).

The "n" classification models 500n have a structure in which the classification candidate values (cdd) of the classification models with the previous sequential numbers affect the next classification model, and the sequential processing order of the "n" classification models 500n may vary according to the feature extraction value. In addition, the order of the classification models 500 for each image may be changed according to the feature extraction value (feat) according to each original image (imgs).

For example, the first classification model 510 may receive a feature extraction value (feat) from the feature extraction value manager 300 and determine the first classification candidate value (cdd1), and the second classification model 520 may determine the second classification candidate value (cdd2) based on the feature extraction value (feat) and the first classification candidate value (cdd1). The second classification model 520 may process the feature extraction value (feat) and the first classification candidate value (cdd1) according to different weights. Also, the second classification model 520 may receive basic classification data (not shown) generated in the classification process from the first classification model 510, in addition to the first classification candidate value cdd1. The "n" classification models 500n configured as described above may repeatedly use data generated from the classification models with the previous sequential numbers, thus preventing deviations or errors between the classification models 500.

In some other embodiments, the classification candidate value (cdd) may be generated one by one for each classification model when the classification models 500 are performed individually, and the classification value manager 700 may determine the classification value (ctgr) in a state in which the "n" classification models 500 all have not completed classification operation according to the accumulation state of the classification candidate values (cdd).

In some other embodiments, in response to the feature extraction value (feat), a classification model having a relatively high classification accuracy is configured as a classification model of a high priority, and a classification model having a relatively low classification accuracy is placed in a low priority, thus enabling flexible configuration to increase the processing speed according to the accuracy. As the classification model has a lower priority, classification can be performed by referring to the feature extraction value (feat), a plurality of classification candidate values (cdd) generated in the previous classification models and classification basic data (not shown), thus providing the faster and more accurate classification results.

Figure 13:
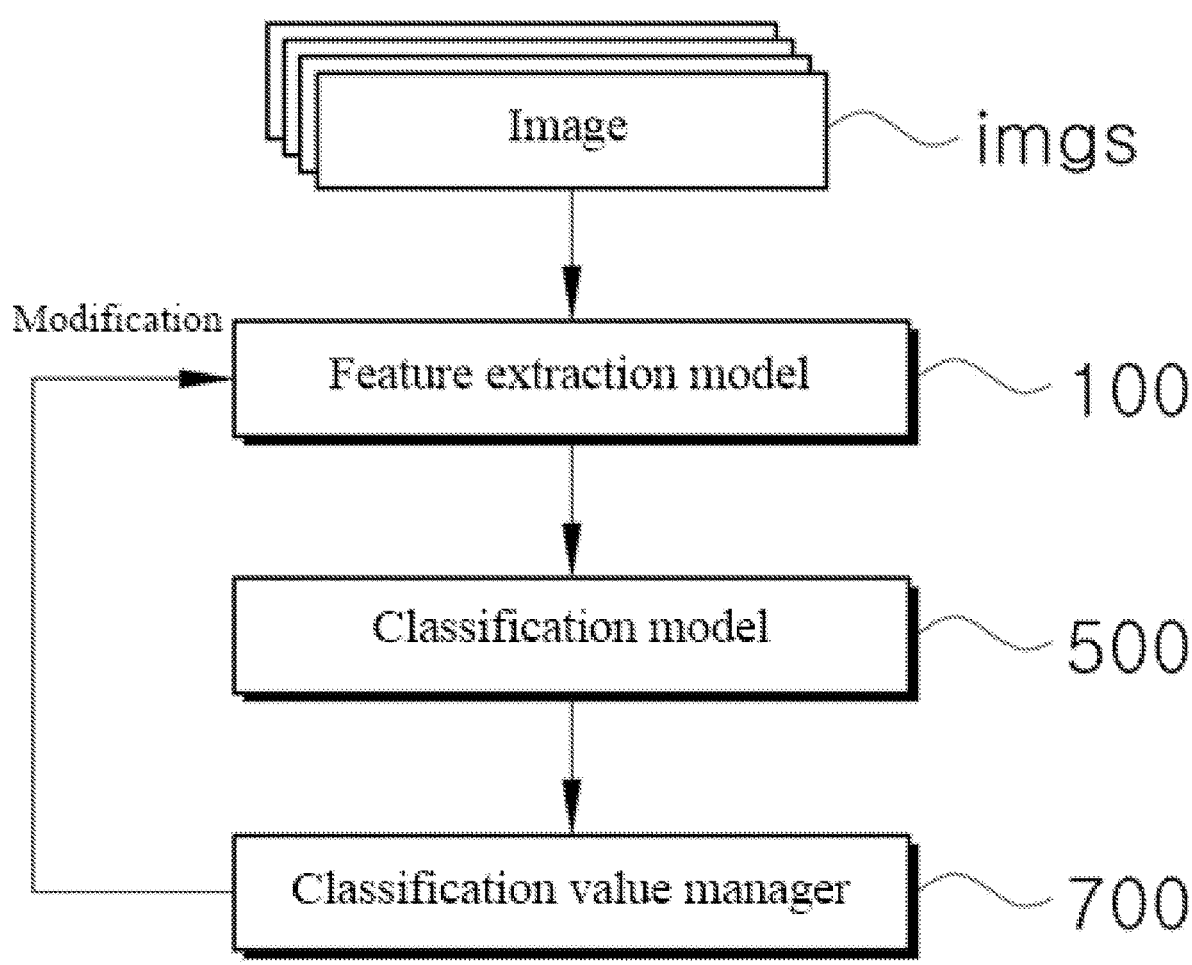
FIG. 13 is a diagram illustrating an image automatic classification and processing method based on a continuous processing structure of multiple AI models according to another embodiment of the inventive concept in which a feature extraction model is modified according to a classification value.

FIG. 13 is a diagram illustrating an image automatic classification and processing method based on a continuous processing structure of multiple AI models according to another embodiment of the inventive concept in which a feature extraction model is modified according to a classification value.

Referring to FIG. 13, the image automatic classification and processing method may further include verifying the classification value (ctgr) of the image data (imgs) to provide a verification result, and modifying the first or second feature extraction models 110 and 120 such that the first or second feature extraction value (feat1 or feat2) is changed based on the verification result. In addition, the image automatic classification and processing method may further include re-determining the classification value (ctgr) of image data (imgs) by inputting the first and second feature extraction values (feat1 and feat2) generated by the modified first or second feature extraction models 110 and 120 into the classification model 500.

In some other embodiments, the image automatic classification and processing method may further include setting the components and variables of the feature extraction value (feat) extracted by the feature extraction model 100 to the maximum, calculating a contribution degree of the applied components and variables to the classification value (ctgr), and selectively determining a feature extraction value (feat) with respect to the components and variables having an upper contribution degree.

For example, since it is difficult to determine information about all components and variables used to determine the feature extraction value (feat) when there is not enough prior data for training the feature extraction model 100, the feature extraction model 100 may initially determine all predefined components and variables by processing input images (imgs), and configure the feature extraction values (feat) based on the components and variables.

The derived feature extraction value (feat) may be input to the classification model 500, and the classification model 500 may determine a predetermined classification value (ctgr) and verify classification accuracy using the determined classification value (ctgr) automatically or manually. The classification value manager 700 may exclude some of the components and variables included in the feature extraction model 100 based on the iteratively verified classification accuracy and configure the feature extraction value (feat) based on the remaining components and variables. The feature extraction model 100 may determine the feature extraction value (feat) faster based on limited components and variables. Components and variables excluded from the feature extraction model 100 have a low contribution degree when their contribution degrees to the classification value (ctgr) are calculated, and do not affect the classification value (ctgr), maintaining accuracy and reliability.

The automatic image classification and processing method based on the continuous processing structure of a multi-artificial intelligence model according to an embodiment of the inventive concept described above is implemented as a program or application to be executed in combination with a computer, which is hardware, and stored on a computer-readable recording medium.

The above-described program may include codes coded in a computer language, such as C, C++, JAVA, Ruby, or a machine language, which are readable by a processor (CPU) of the computer through a device interface of the computer such that the computer reads the program and execute the methods implemented by the program. The codes may include functional codes associated with a function defining functions necessary to execute the methods or the like, and include control codes associated with an execution procedure necessary for the processor of the computer to execute the functions according to a predetermined procedure. In addition, the codes may further include memory reference codes indicating at which location (address number) of the computer's internal or external memory, additional information or media required for the computer's processor to execute the functions can be referenced. In addition, when the processor of the computer needs to communicate with any other computer or server located remotely to execute the above functions, codes may further include communication-related codes for how to communicate with any other remote computer or server using a communication module of the computer, and what information or media to transmit/receive during communication.

The storage medium refers to a medium that stores data semi-permanently rather than a medium storing data for a very short time, such as a register, a cache, and a memory, and is readable by an apparatus. Specifically, examples of the storage medium may include, but are not limited to, a ROM, a RAM, a CD-ROM, a magnetic tape, a floppy disk, an optical data storage device, and the like. That is, the program may be stored in various recording media on various servers to which the computer can access or various recording media on the computer of a user. The medium may also be distributed to a computer system connected thereto through a network and store computer readable codes in a distributed manner.

Although embodiments of the present disclosure have been described above with reference to the accompanying drawings, it is understood that those skilled in the art to which the present disclosure pertains may implement the present disclosure in other specific forms without changing the technical spirit or essential features thereof. Therefore, it should be understood that the embodiments described above are illustrative in all respects and not restrictive.

According to the inventive concept described above, it is possible to provide an effective and new image labeling processing method in which a direct labeling method by an operator and an automatic labeling method are combined.

In addition, it is possible to provide a method for automatically and quickly classifying a suitable image labeling method in consideration of image characteristics without a process of manually classifying a large number of images by an operator.

In addition, it is possible to provide a method for classifying image labeling types, which can define and provide efficient feature extraction values that can be commonly applied to multiple classification models.

In particular, it is possible to provide a new type of automatic labeling complex model capable of performing suitable image classification by configuring a plurality of models that perform only a simple automatic labeling function in a complex manner.

In addition, it is possible to provide an efficient method for simultaneously processing classification of labeling types of images and automatic labeling processing through one solution.

In addition, it is possible to provide an image classification method with improved classification stability and processing accuracy by utilizing a number of previously verified classification models.

Further, it is possible to provide a method to which classification model utilization technology capable of further improving and accelerating classification and processing speed is applied.

Further, it is possible to provide a method for upgrading an existing model based on classification and processed image labeling results.

However, the effects of the inventive concept may not be limited to the above-described effects. Although not described herein, other effects of the inventive concept can be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An automatic image classification and processing method based on a continuous processing structure of multiple artificial intelligence models, the method comprising:
   receiving image data;
   generating a first feature extraction value by inputting the image data into a first feature extraction model among feature extraction models;
   generating a second feature extraction value by inputting the image data into a second feature extraction model among the feature extraction models; and
   determining a classification value of the image data by inputting the first and second feature extraction values into a classification model,
   wherein the classification model consists of "n" classification models,
   wherein the determining of the classification value includes:
   determining the classification value from "n" classification candidate values output from a first classification model to an n-th classification model, respectively; and
   determining the classification candidate value, which is repeatedly output "m" or more times, as the classification value, among the "n" classification candidate values,
   wherein the determining of the classification value includes determining the classification value in advance before the classification candidate values are output from the n-p classification models when a classification candidate value which is output repeatedly "m" or more times is generated from "p" (p<n) classification models sequentially according to an order of outputting the classification candidate values among the "n" classification models,
   wherein each of the output classification candidate values is output respectively from the first classification model to the n-th classification models based on feature extraction values including the first feature extraction value and the second feature extraction value input into the first classification model to the n-th classification models, and wherein the feature extraction model operates in a first mode for determining the feature extraction value based on whether the classification value is determined or a second mode for generating a preprocessing result corresponding to the image data.

2. The method of claim 1, wherein the first feature extraction model recognizes character objects on the image data.

3. The method of claim 2, wherein the first feature extraction value includes a number of the character objects on the image data.

4. The method of claim 2, wherein the first feature extraction value includes a ratio of an area of the character objects to a total area of the image data.

5. The method of claim 4, wherein the character objects includes a plurality of different types, and
wherein the area ratio is calculated as a ratio of sum of total areas of the plurality of the character objects.

6. The method of claim 1, wherein the second feature extraction model recognizes identification objects on the image data.

7. The method of claim 6, wherein the second feature extraction value includes a number of identification objects on the image data.

8. The method of claim 6, wherein the second feature extraction value includes a ratio of an area of the identification objects to a total area of the image data or a shape of the identification objects.

9. The method of claim 8, wherein the identification objects include a plurality of different types, and
wherein the area ratio is calculated as a ratio of sum of total areas of the plurality of the identification objects.

10. The method of claim 1, wherein types of the classification candidate value correspond to a number of the feature extraction models.

11. The method of claim 1, wherein the "n" classification models receive the first and second feature extraction values and perform classification operation in parallel.

12. The method of claim 1, wherein the classification model includes one of a decision tree classification model, a random forest classification model, and a logistic regression classification model.

13. The method of claim 1, wherein the classification model includes one of XGBOOST, AdaBOOST, CatBOOST, and LightBGM classification models.

14. The method of claim 1, further comprising:
providing a verification result by verifying the classification value of the image data;
modifying the first or second feature extraction model such that the first or second feature extraction value is changed based on the verification result; and
re-determining the classification value of the image data by inputting the first and second feature extraction values generated by the modified first or second feature extraction models into the classification model.

15. A computer-readable recording medium in which a program for executing the method of claim 1 is stored in combination with a computer as hardware.

* * * * *